United States Patent [19]
Hauck et al.

[11] Patent Number: 5,434,500
[45] Date of Patent: Jul. 18, 1995

[54] MAGNETIC FIELD GENERATOR AND DETECTOR POSITION INDICATOR

[76] Inventors: Bruce Hauck, 205 W. Main St., Mascoutah, Ill. 62258; Gwynn Holbrook, 111 Dynasty Dr., Cary, N.C. 27513

[21] Appl. No.: 96,308

[22] Filed: Jul. 26, 1993

[51] Int. Cl.⁶ .................. G01R 33/02; G01B 7/00; G01B 7/31
[52] U.S. Cl. .................. 324/67; 324/207.17; 324/207.26; 324/258; 324/260
[58] Field of Search ............ 324/67, 207.17, 207.26, 324/258, 260, 326, 529

[56] References Cited

U.S. PATENT DOCUMENTS

| | | | |
|---|---|---|---|
| 1,971,189 | 8/1934 | Leibing | 324/67 |
| 3,836,848 | 9/1974 | Blevins | 324/67 |
| 4,317,079 | 2/1982 | Yamamura et al. | 324/326 |
| 4,998,058 | 3/1991 | Tofte et al. | 324/67 |

Primary Examiner—Gerard R. Strecker

[57] ABSTRACT

A device for determining a position by locating a point on one side of a barrier such as a wall from the other side of the barrier has two main parts, a magnetic field generator (sending unit) and a receiver (receiving unit) which is able to detect the magnetic field. The sending unit, which is placed on the first side of the wall at the spot to be located, creates a magnetic field at that spot. The receiving unit is composed of two pairs of detectors (four detectors total) which measure the relative strength of the magnetic field at each detector. Measurement of the relative strength of the magnetic field at each detector allows the position of the source to be determined. The strength of the field is indicated by the display of light emitting diodes. When the strength of the field is equal at all four points the receiving unit is centered directly on the opposite side of the wall from the sending unit.

2 Claims, 5 Drawing Sheets

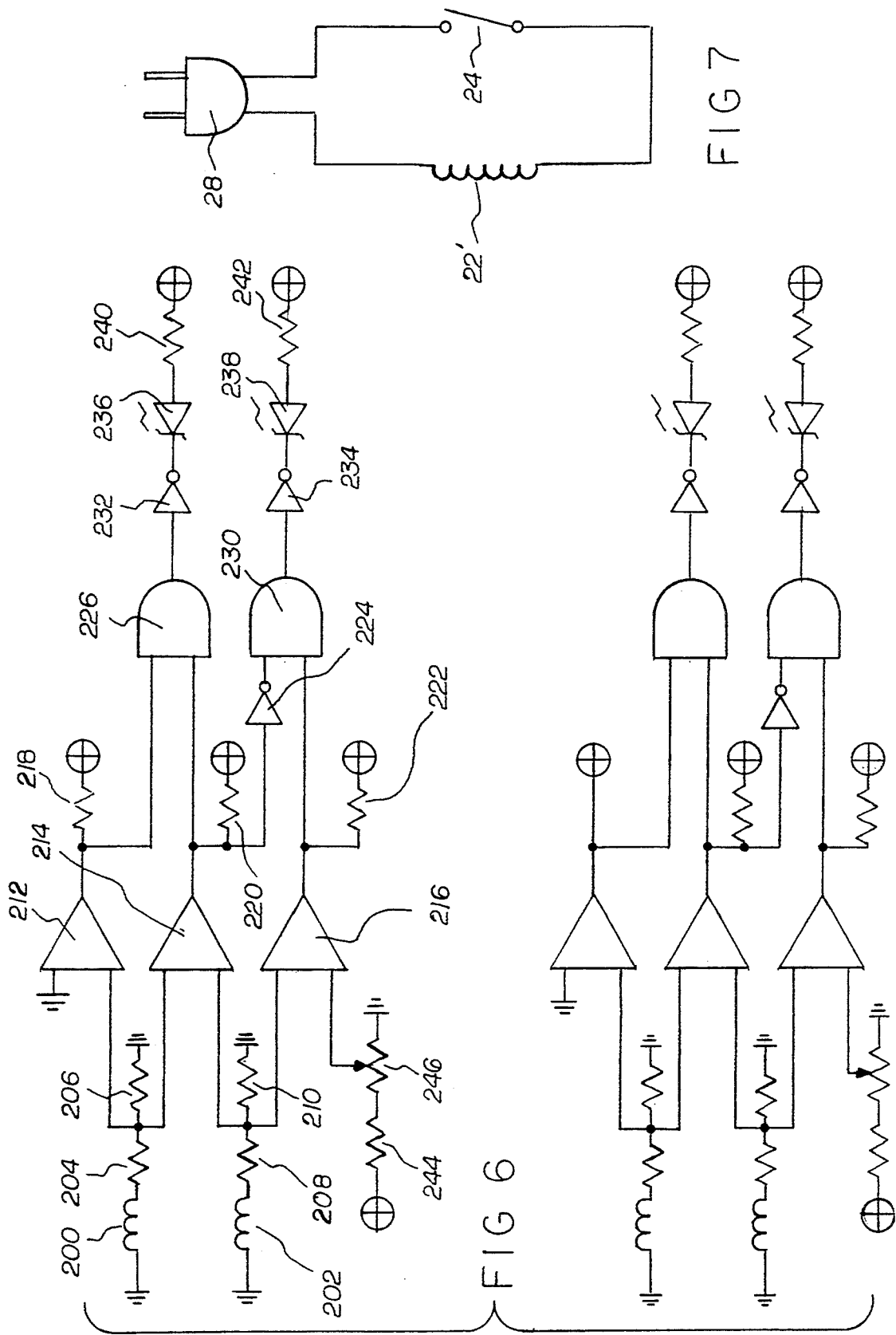

MAGNETIC FIELD GENERATOR AND DETECTOR POSITION INDICATOR

BACKGROUND OF THE INVENTION

1. Field of the Invention

The present invention relates generally to locating devices, and more particularly, to a device which can accurately determine a position on one side of a wall or other barrier from the other side of the wall or other barrier.

2. Description of the Prior Art

Often in the building and construction industries it is necessary to locate a position on both sides of a wall or other barrier. For example, it may be necessary to put an entrance or exit through a barrier such as a wall or roof. It is usually very important for the workers to know where the entrance or exit or hole is going to come out on the other side of the partition. Prior art methods of locating a position directly opposite the same position on the opposite side of a partition usually require measuring with measuring sticks and tapes. These prior art methods are usually time consuming and cumbersome, and they often lead only to an approximate spot location.

What is needed is a device which can accurately, precisely and relatively quickly find a position on one side of a partition directly opposite the same point on the opposite side of the wall. The device should be simple and cost effective.

The foregoing disadvantages and needs are overcome by a unique wall position locator of the present invention as will be made apparent from the following description thereof. Other advantages of the present invention over the prior art also will be rendered evident.

SUMMARY OF THE INVENTION

To achieve the foregoing and other advantages, the present invention, briefly described, provides a device for locating a position on one side of a barrier such as a wall from the other side of the barrier. The device has two main parts, a magnetic field generator (sending unit) and a receiver (receiving unit) which is able to detect the magnetic field. The sending unit, which is placed on the first side of the wall at the spot to be located, creates a magnetic field at that spot. The receiving unit is composed of two pairs of detectors (four detectors total) which measure the relative strength of the magnetic field at each detector. Measurement of the relative strength of the magnetic field at each detector allows the position of the source to be determined. The strength of the field is indicated by the display of light emitting diodes. When the strength of the field is equal at all four points the receiving unit is centered directly on the opposite side of the wall from the sending unit.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the preferred embodiment of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved wall position locator which has all of the advantages of the prior art and none of the disadvantages.

It is another object of the present invention to provide a new and improved wall position locator which may be easily and efficiently manufactured and marketed.

It is a further objective of the present invention to provide a new and improved wall position locator which is of durable and reliable construction.

An even further object of the present invention is to provide a new and improved wall position locator which is susceptible of a low cost of manufacture with regard to both materials and labor, and which accordingly is then susceptible of low prices of sale to the consuming public, thereby making such wall position locator available to the buying public.

Still yet a further object of the present invention is to provide a new and improved wall position locator which can locate a spot on one side of a wall or other partition from the opposite side of the wall or partition.

It is still a further object of the present invention to provide a new and improved wall portion locator having a magnetic field generating sending unit and a magnetic field detecting unit.

Still a further object of the present invention is to provide a new and improved wall position locator including means for generating a magnetic field on one side of a wall or other partition and means for detecting the magnetic field from the opposite side of the wall or partition.

It is yet still a further object of the present invention to provide a new and improved wall position locator which can be used in many industries such as the businesses of building, remodeling, repairing and improving homes, business and industrial buildings.

Still yet a further object of the present invention is to provide a new and improved wall position locator including means for allowing a craftsperson to locate the exact position on both sides of a barrier the craftsperson wishes to drill, fasten or remove, without the need for any mental calculation.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 6 is a schematic circuit diagram of a receiving unit in accordance with the present invention.

FIG. 7 is a schematic circuit diagram of a magnetic field sending unit in accordance with the present invention.

DESCRIPTION OF THE PREFERRED EMBODIMENT

With reference now to the drawings, a new and improved wall position locator embodying the principles and concepts of the present invention will be described.

Figure 1:
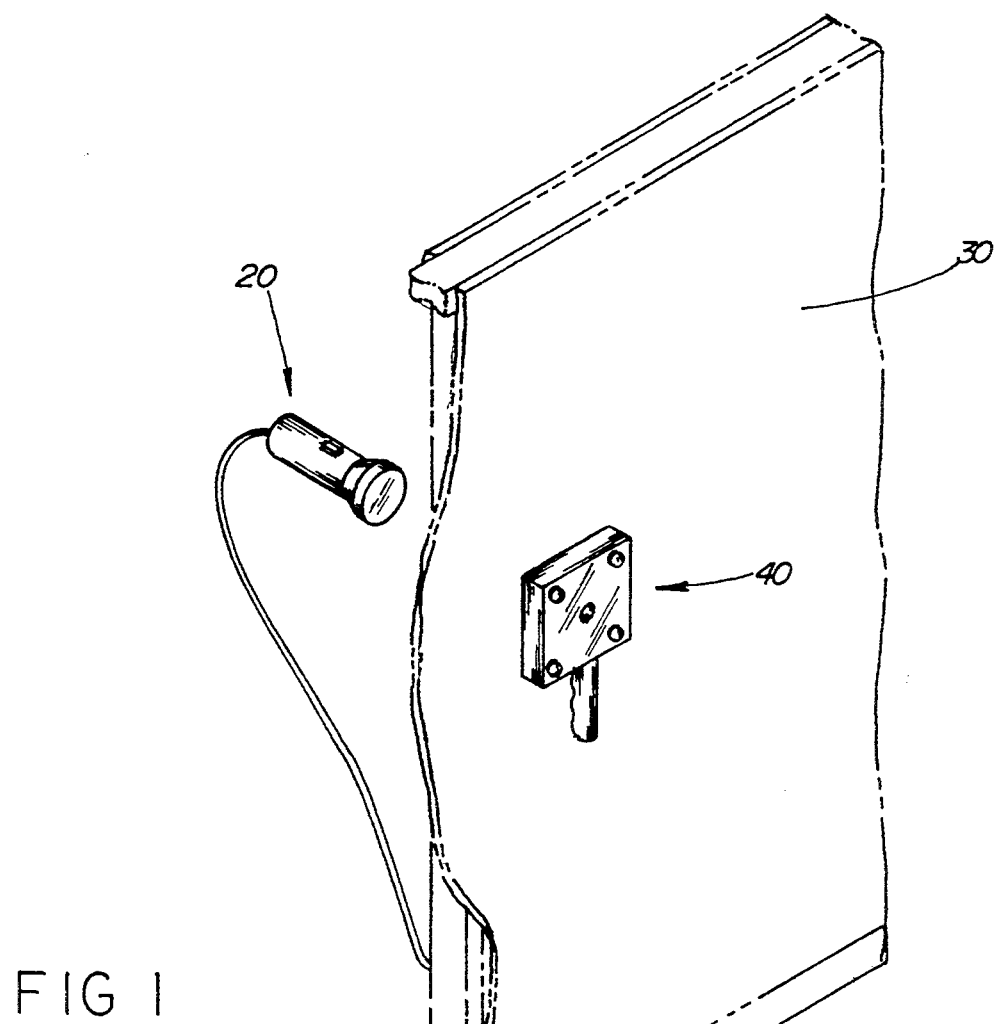
FIG. 1 is a perspective view in elevation showing the first preferred embodiment of the wall position locator of the present invention on a partition.

Turning initially to FIG. 1, there is shown, on opposite sides of a partition 30, a preferred and exemplary embodiment of the two units which comprise the wall position locator of the present invention. The two units are the magnetic field generating sending unit generally designated by reference numeral 20 and the magnetic field detecting unit generally designated with the reference numeral 40.

Figure 2:
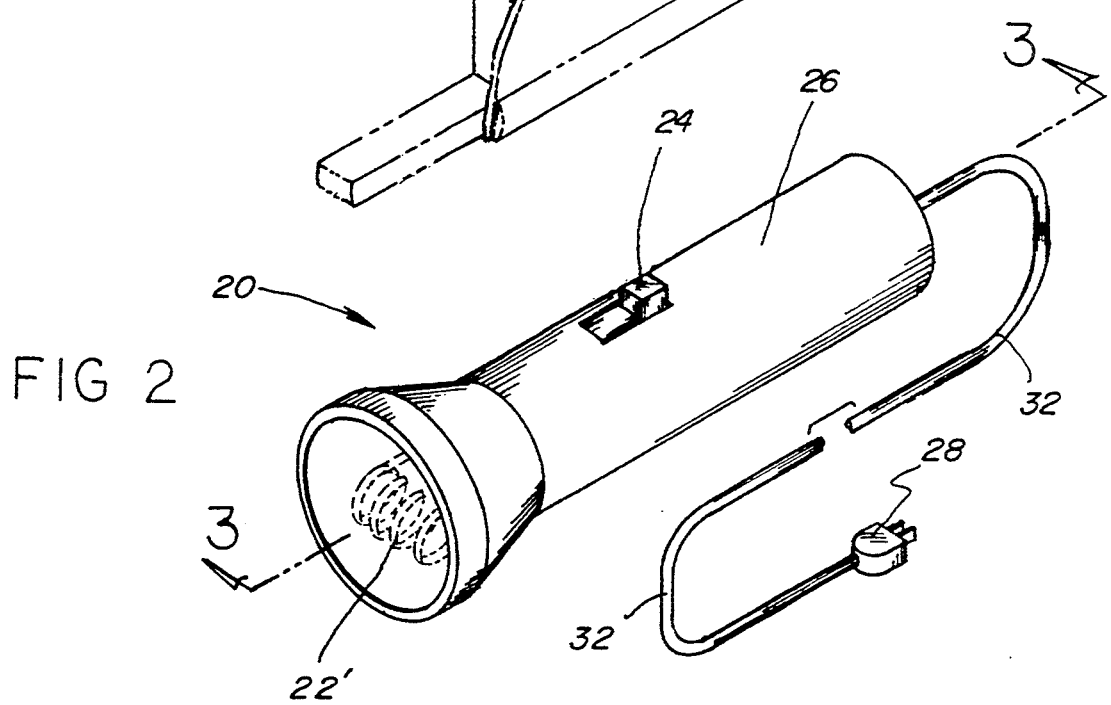
FIG. 2 is a perspective view in elevation of the magnetic field sending unit of the wall position locator of FIG. 1 in accordance with the present invention.
Figure 3:
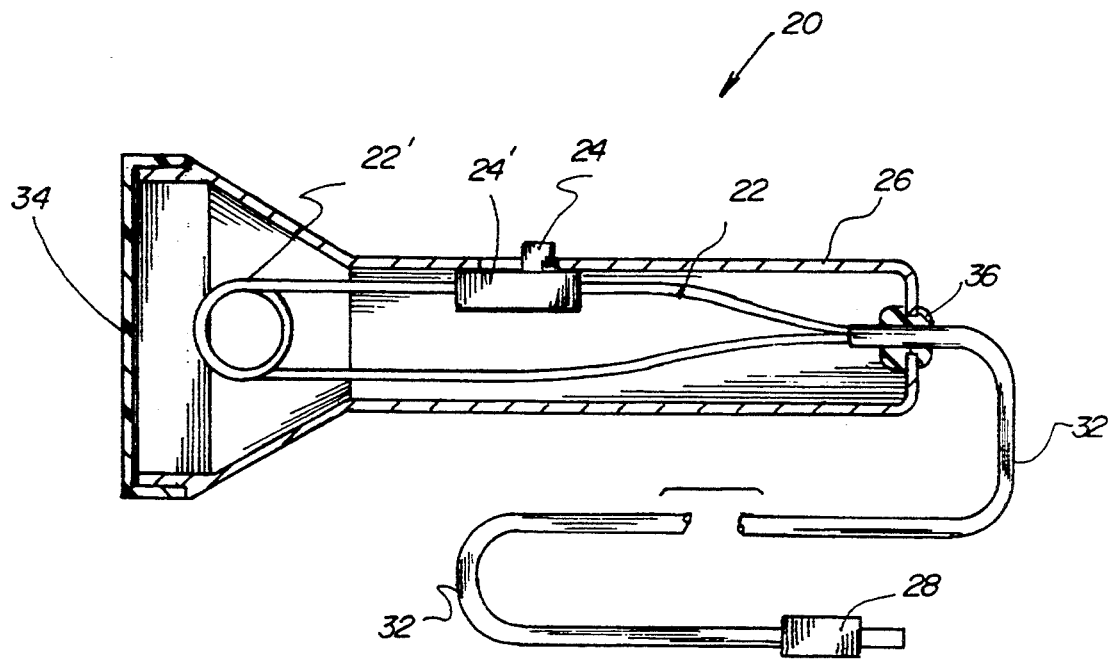
FIG. 3 is a cross-sectional view of the magnetic field sending unit of the wall position locator of FIG. 2 taken along line 3—3 thereof all in accordance with the present invention.

The magnetic field generating sending unit 20 is shown in more detail in FIGS. 2, 3 and 7. In its preferred form, the sending unit 20 of the wall position locator comprises generally a casing or housing 26 containing a magnetic field generating wire 22, the magnetic field generated by coil 22'. An on/off switch 24 is used to turn the electricity on to generate the magnetic field. The on/off switch 24 is fixed to the on/off switch box 24' which also supports the wire 22 within the casing 26.

In the preferred embodiment, electricity is provided by altering current from a standard electrical outlet. Plug 28 is plugged into a standard AC socket. Alternatively, a battery or other source of electricity could be used for the present invention. Electrical cord 32 extends from the wire 22 to the plug 28. The cord 32 passes through the back of the casing 26 and is held in place by holding piece or grommet 36.

The sending unit 20 preferably has a front face cover 34 which can be seen in FIG. 1. The sending unit 20 is shown in FIG. 2 without the front face cover 34.

The electrical circuit diagram for sending unit 20 is shown in FIG. 7.

Figure 4:
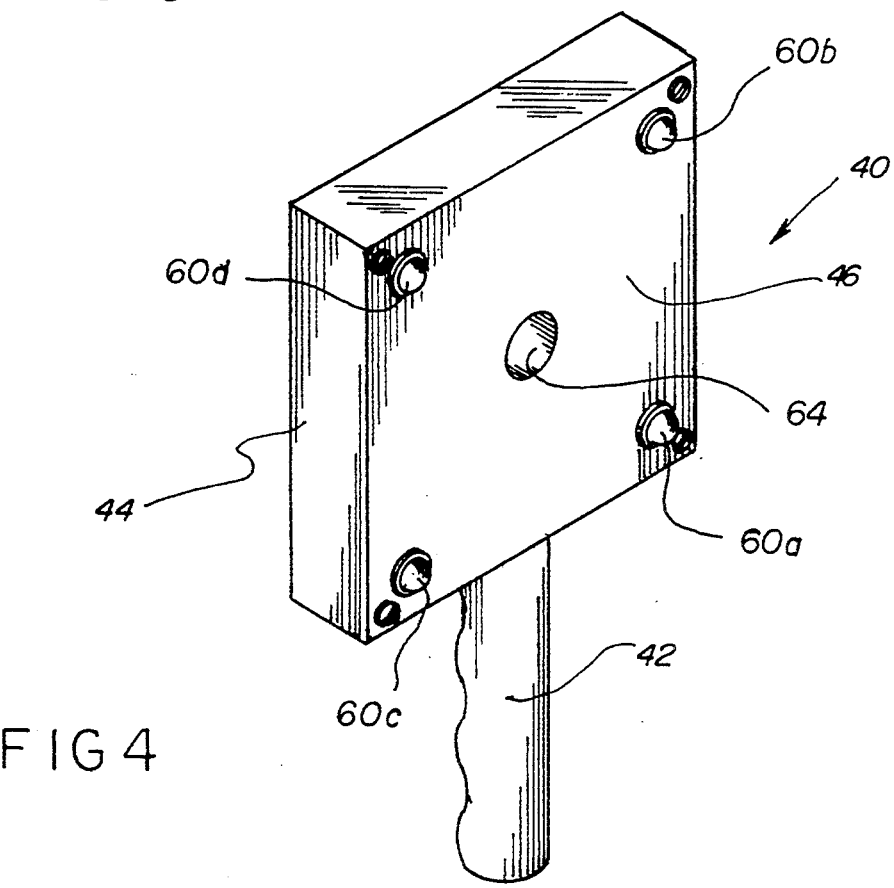
FIG. 4 is a perspective view in elevation of the magnetic field receiving unit of the wall position locator of FIG. 1 in accordance with the present invention.
Figure 5:
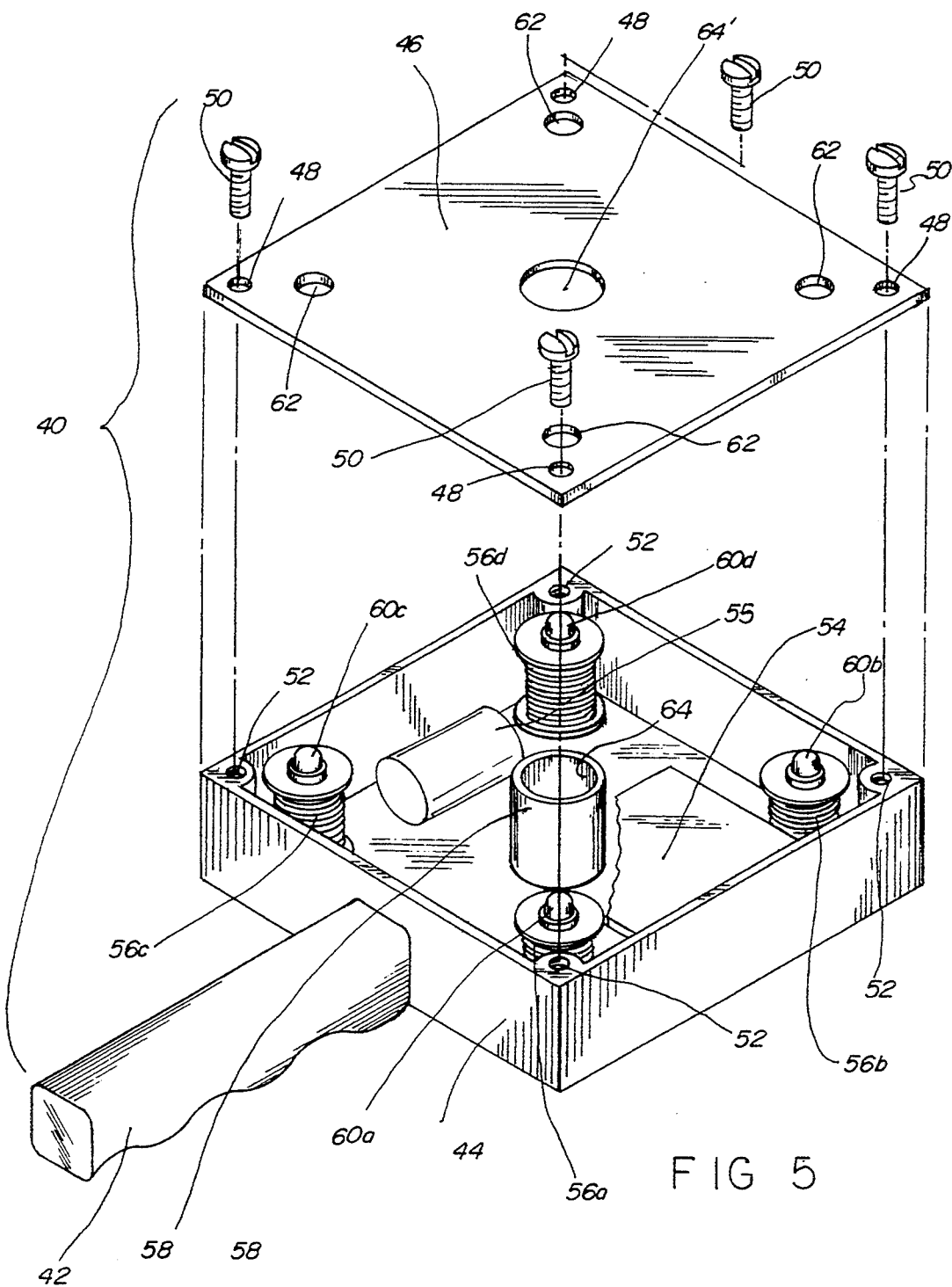
FIG. 5 is a perspective view of the magnetic field sending unit of the wall position locator of FIG. 4 partially taken apart all in accordance with the present invention.

The magnetic field detecting unit 40 is shown in FIGS. 4 and 5. The detecting unit 40 is comprised generally of a box shaped main body 44 having a handle 42. A cover plate 46 fits over the open side of the main body 44 as can be seen in FIG. 5. The cover plate 46 is preferably fixed to the main body 44 by means of four threaded screws 50 which can pass through the four small holes 48 in cover plate 46. The screws 50 can then be threaded and tightened into the for threaded holes 52 in the main body 44. While screws 50 are the preferred means for attaching the cover plate 46, any practical attaching means could be used within the scope of the present invention.

The preferred magnetic field detecting means is the use of two pairs of detectors (four dectors total). The detectors are preferably wire coils 56a, 56b, 56c, and 56d. A circuit board 54 is placed between the wire coils 56a and 56b. A battery 55 is located between wire coils 56c and 56d.

In the middle of the unit is a central, hollow cylindrical hole piece 58 fixed to the bottom of the main body 44 for defining a through hole 64 and helping to retain cover plate 46 in its intended position.

Located atop the coils 56a, 56b, 56c, and 56d are LED displays 60a, 60b, 60c, 60d respectively. The cover plate 46 has four holes 62 through which the LED displays 60a, 60b, 60c, 60d protrude. The cover plate 46 also has a central hole 64' which corresponds with and receives the end of central hole piece 58. By this arrangement, Hole 64' is coaxially aligned with hole 64 when cover plate 46 is affixed in place on reciever 40.

Figure 8:
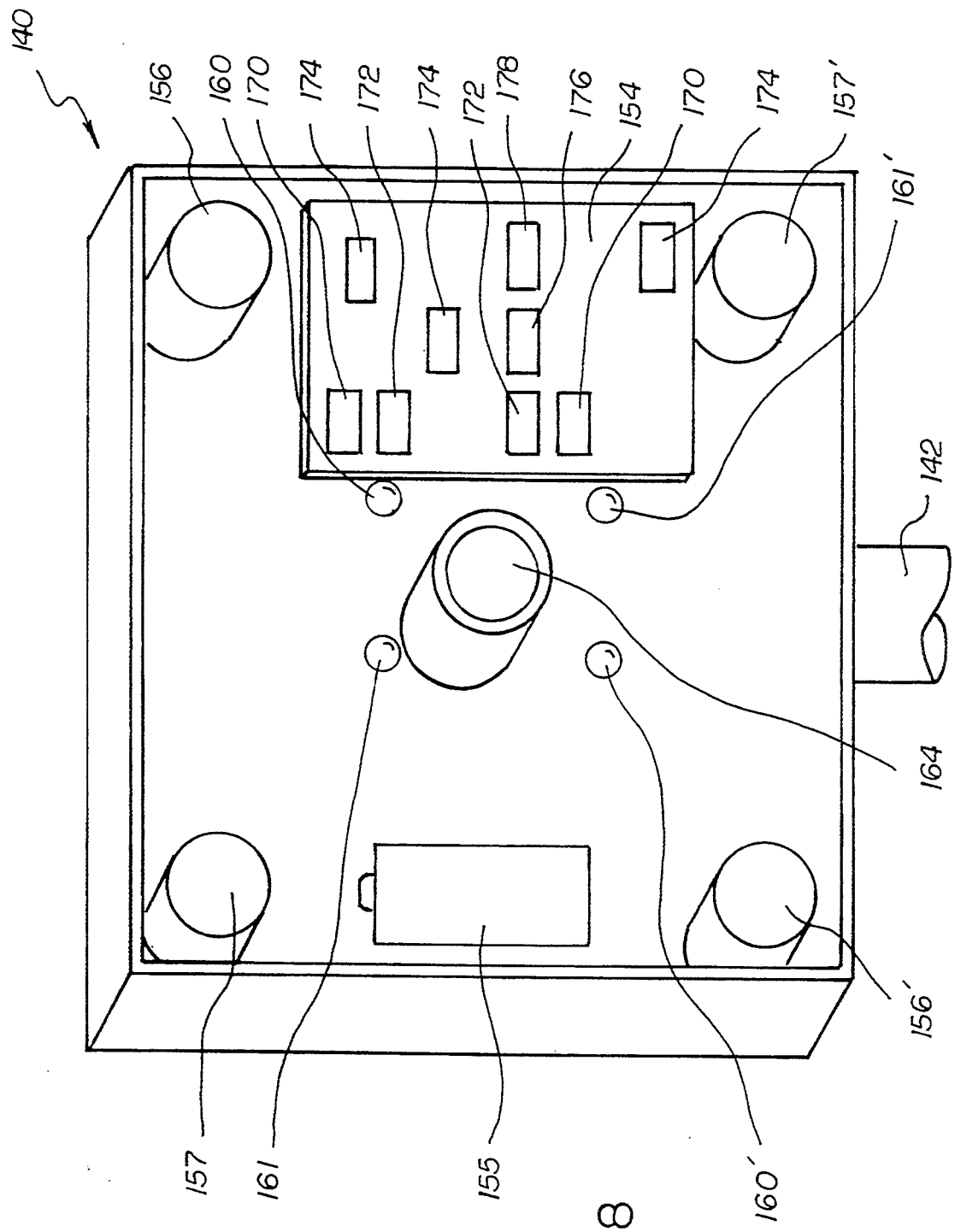
FIG. 8 is a perspective view of second preferred embodiment of a magnetic field position locating unit in accordance with the present invention.

A second alternatively preferred embodiment of the magnetic field detecting device designated generally by reference numeral 140 is shown in FIG. 8. The FIG. 8 device is similar to the FIG. 5 device. The device 140 has a handle 142 and contains a battery 155, a through hole 164 and two pairs of coils. The first pair of coils is 156 and 156' and the second pair of coils is 157 and 157'. LEDs 160 and 160' correspond with coils 156 and 156', while LEDs 161, 161' correspond with coils 157 and 157'.

The device 140 also preferably contains potentiometer 170, LM 339 comparators 172, resistor networks 174, 74CO8 AND gates 176 and 4049 invertors 178.

A schematic electrical circuit diagram of either receiving unit 40 or 140 is shown in FIG. 6.

In accordance with the invention, the receiver unit or device has two pairs of coils mounted diagonally opposite in the box. The strength of the magnetic field generated by the source will induce a greater voltage in one of the coils of each pair than in the other member of the pair. A light emitting diode (LED) will light to indicate which coil of each pair is nearer to the source. By moving the receiver until the lights in each pair have an equal intensity, the correct position can be determined.

The triangular components (voltage comparators) nearest the coils compare the voltage induced into the coils. The coil with the greater induced voltage is nearer the source than the other coil of the pair. The other circuitry provides a clear visual display of the relative positions of the coils to the source.

There are two identical circuits (one for each pair of diagonally aligned LEDs), so only one will be described in detail with the understanding that the other is identical. Each of the two sets of circuitry is used to determine position in one orthogonal dimension. The presence of a magnetic field causes a voltage to be induced in coils 200 and 202. It will be understood that coils 200, 202 correspond to the coils of each diagonal pair, i.e. coils 56a, 56d and coils 56b and 56c of FIG. 5; or coils 157, 157' and coils 156' of FIG. 8. Resistors 204 and 206 are a voltage divider network for one side of voltage comparators 212 and 214. Resistors 208 and 210 are a voltage divider network for the other side of voltage comparator 214 and one side of voltage comparator 216. Voltage comparator 214 will output either a high or low voltage depending on Whether coil 200 and 202 has the greater induced voltage. Voltage comparator 212 will have a high output only when the induced voltage on coil 202 at the junction of resistors 204 and 206 is more positive than the reference ground. Voltage comparator 216 will have a high output only when the induced voltage on coil 202 at the junction of resistors 208 and 210 is more positive than the voltage at the junction of resistors 244 and 246.

Resistors 218, 220 and 222 are pull up resistors for the outputs of voltage comparators 212; 214, and 216. They provide a high voltage only when the output of the voltage comparators does not pull them low.

AND gate 226 will have a high output when the output of voltage comparators 212 and 214 are high. This will cause the output of invertor 232 to go low. This will cause LED 236 to glow. Resistor 240 limits current through LED 236.

AND gate 230 will have a high output when the output of voltage comparator 216 is high and voltage comparator 214 is low. The output of voltage comparator 214 is inverted by invertor 224. This will cause the output of invertor 234 to go low and LED 238 to glow. Resistor 242 limits the current through LED 238.

Use of the wall position locator of the present invention is very simple. The LEDs of each set of circuitry are placed at diagonally opposite corners of the receiver box. By moving the receiver until the LEDs are lighted equally, the receiver can be centered on the source magnetic field. The source of the magnetic field is a simple coil. By connecting the coil to an AC supply, a continuously varying magnetic field is produced. It is this field that the receiver detects. The receiver has a hole in its middle (e.g. hole 64) to make it easy to mark the discovered location with a pencil or the like.

Referring now particularly to FIG. 1, the plug 28 (FIG. 2) of the magnetic field generating sending unit 20 is plugged into a standard wall AC outlet. A first person then will hold the magnetic field generating sending unit 20 against a wall 30 (or other partition) at the desired point of reference. A second person then can take the magnetic field detecting unit 40 (or 140) to the other side of the wall (or other partition). The first person then turns the on/off switch 24 to the on position causing an electric circuit to be created with the coil of magnetic field generating wire 22 generating a magnetic field. The second person holds the detector 40 to the other side of the wall at a point in the general vicinity of being opposite from the spot on the other side where the sending unit 20 is located. The second person (the person holding the detector) then moves the detector around until at least one of the diagonal pairs of LEDs lights up. Once one of the diagonal pairs of LEDs is lit, the second person will know that they are near the exact spot. The detector 40 is then slowly moved around until the other pair of LEDs lights up and then until all of the LEDs are lit to an equal brightness. At that point, the detector should be on the exact spot on the detector side of the wall opposite the sending unit 20 point on the sending unit side of the wall and a mark can be made on the wall through the hole 64 in the unit.

Alternatively, an attaching means could be used to hold the sending unit 20 to the wall 30 at the desired spot making the entire wall position device (both the sending unit 20 and the detecting unit 40) usable by a single person (eliminating the need for a person to hold the sending unit 20 against the wall).

The order of use could alternatively be to have a first person hold the detecting unit 40 against the wall while the sending unit is moved around. This is a less desirable method since the person holding the detecting unit 40 will have to constantly be telling the person holding the sending unit 20 how many LEDs are lit and what direction to move in.

The LEDs could alternatively be replaced by some other type of signalling means such as a different type of visual signal or an auditory signal which grows stronger as the detector is centered in the magnetic field. Also alternatively, only one LED could be used which would light when the four coils 56a, 56b, 56c and 56d indicate that the detector 40 is centered.

The present invention can be used to determine the exact location of the sending unit with pinpoint accuracy. It can be used from the opposite side of a wall, floor, ceiling, roof, divider, or practically any other type of partition. The present invention can be used in the building, construction and design industries, etc. The present invention can be used by carpenters, electricians, plumbers, heating and cooling installers, telephone installation and repairmen, cable TV installers, computer and network installers, etc.

For an example of a possible use, it may be desired to mount a ceiling fan in the center of a bedroom. However, it will be impossible to determine the position of the center of the room from the attic and it will be impossible to determine where to drill for a support for the fan from the bedroom. By placing the sending unit 20 at the center of the bedroom, the receiver can be used in the attic to determine where to mount the fan.

The invention will allow craftspeople to quickly locate the exact position on the opposite side of a barrier they wish to fasten, drill, or remove. Use of the invention will save time, increase accuracy and increase safety on job sites. Exact points of reference can be located quickly and accurately such as, for example, for entrances and exits and for routes. The original area is not disturbed or marked during the use of the invention. The invention will give an accurate value unlike the prior art measuring methods which usually lead to estimated values.

It is apparent from the above that the present invention accomplishes all of the objectives set forth by providing a new and improved partition position locator for locating a point on a first side of a partition which is opposite a point on the other side of the partition made up of a magnetic field generating means and a magnetic field detecting means having at least one signalling means which signals when a magnetic field is detected, such that the magnetic field generating means can be placed at the point on the first side of the partition and the magnetic field detecting means can be moved around on the other side of the partition until the at least one signalling means signals the presence of a magnetic field indicating that the point opposite the first point has been found. The magnetic field generating device can generate a magnetic field from an electric current. The magnetic field generating device can be enclosed in a casing and can have an on/off switch. The magnetic field detecting device can be made up of at least three, and preferably four, magnetic field detecting means, such as magnetic field detecting coils, spaced apart such that the spot of the magnetic field can be determined on the plane of the partition. The signalling means can be at least one LED and preferably four LEDs.

The present invention also is a method of determining the location of a point on a first side of a partition which is opposite a point on the other side of the partition having the steps of: placing a magnetic field generating means on one side of the partition at the point; moving a magnetic field detecting means having at least one signalling means which signals when a magnetic field is detected around on the opposite side of the partition until the signal means indicates that the opposite point has been found.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrate in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A position locator comprising:
    sending unit means for generating a magnetic field from an alternating current source, the sending unit means comprising a casing having a front end; a coil positioned within the front end of the casing; a switch in electrical communication with the coil; and a plug in electrical communication with the switch, whereby the plug can be engaged to an alternating current power source to permit alternating current to flow through the coil to generate a magnetic field radiating therefrom;
    a magnetic field detecting means for detecting a magnetic field generated by the sending unit means and for indicating a position of the magnetic field detecting means relative to the sending unit means, the magnetic field detecting means comprising a substantially square main body having four corners with a first coil mounted to the main body proximal to a first corner thereof, a second coil mounted to the main body proximal to a second corner diagonally opposite the first corner, a third coil mounted to the main body proximal to a third corner thereof, and a fourth coil mounted to the main body proximal to a fourth corner diagonally opposite the third corner of the main body; a first comparator means in electrical communication with the first coil and the second coil for generating a first comparative signal corresponding to a voltage output of the first coil relative to a voltage output of the second coil; a first AND gate means in electrical communication with the first comparator means for generating a first AND gate signal corresponding to the voltage output of the first coil relative to the voltage output of the second coil; a first LED means in electrical communication with the first AND gate means and electrically communicable with a power source for illuminating when the voltage output of the first coil is substantially higher than the voltage output of the second coil; a second AND gate means in electrical communication with the first comparator means for generating a second AND gate signal corresponding to the voltage output of the first coil relative to the voltage output of the second coil; a second LED means in electrical communication with the second AND gate means and electrically communicable with a power source for illuminating when the voltage output of the second coil is substantially higher than the voltage output of the first coil; a second comparator means in electrical communication with the third coil and the fourth coil for generating a second comparative signal corresponding to a voltage output of the third coil relative to a voltage output of the fourth coil; a third AND gate means in electrical communication with the second comparator means for generating a third AND gate signal corresponding to the voltage output of the third coil relative to the voltage output of the fourth coil; a third LED means in electrical communication with the third AND gate means and electrically communicable with a power source for illuminating when the voltage output of the third coil is substantially higher than the voltage output of the fourth coil; a fourth AND gate means in electrical communication with the second comparator means for generating a fourth AND gate signal corresponding to the voltage output of the third coil relative to the voltage output of the fourth coil; and a fourth LED means in electrical communication with the fourth AND gate means and electrically communicable with a power source for illuminating when the voltage output of the fourth coil is substantially higher than the voltage output of the third coil, whereby the sending unit means can be positioned on a first side of a wall, with the magnetic field detecting means being positionable on a second side of the wall, wherein the LED means of the magnetic field detecting means cooperate to indicate a position of the magnetic field detecting means relative to the sending unit means.

2. The position locator of claim 1, wherein the main body is shaped so as to define a hole extending therethrough centered between the first coil, the second coil, the third coil, and the fourth coil for permitting a passage of a marking means therethrough for marking a wall against which the main body is positionable.

* * * * *